(12) United States Patent
Cooper

(10) Patent No.: US 11,034,082 B2
(45) Date of Patent: Jun. 15, 2021

(54) SENSOR THAT SIMULATES RESIN OPTICAL PROPERTIES

(71) Applicant: 3D Systems, Inc., Rock Hill, SC (US)

(72) Inventor: Guthrie Cooper, Mill Spring, NC (US)

(73) Assignee: 3D Systems, Inc., Rock Hill, SC (US)

( * ) Notice: Subject to any disclaimer, the term of this patent is extended or adjusted under 35 U.S.C. 154(b) by 853 days.

(21) Appl. No.: 15/842,041

(22) Filed: Dec. 14, 2017

(65) Prior Publication Data

US 2018/0186066 A1    Jul. 5, 2018

Related U.S. Application Data

(60) Provisional application No. 62/440,168, filed on Dec. 29, 2016.

(51) Int. Cl.
*B29C 64/112*       (2017.01)
*B33Y 50/02*        (2015.01)
(Continued)

(52) U.S. Cl.
CPC .......... *B29C 64/112* (2017.08); *B29C 64/124* (2017.08); *B29C 64/129* (2017.08); *B29C 64/135* (2017.08); *B29C 64/393* (2017.08); *B33Y 50/02* (2014.12); *G01M 11/00* (2013.01); *G05B 2219/49007* (2013.01)

(58) Field of Classification Search
CPC   B29C 64/124–129; B29C 64/386–393; B29C 67/0051; B22F 3/1055; B22F 10/12
See application file for complete search history.

(56) References Cited

U.S. PATENT DOCUMENTS 5,133,987 A    7/1992  Spence et al.
5,267,013 A *  11/1993 Spence ................... G06T 17/10
                                                        356/121
(Continued)

FOREIGN PATENT DOCUMENTS

JP    H03218816 A    9/1991
JP    H0596633 A     4/1993
(Continued)

OTHER PUBLICATIONS

PCT International Search Report for International Application No. PCT/US2017/066366, dated Apr. 5, 2018 (6 pages).
(Continued)

*Primary Examiner* — Matthew J Daniels
*Assistant Examiner* — Andrew L Swanson

(57) ABSTRACT

A method and system for calibrating a three dimensional printing system includes a specialized sensor. The three dimensional printing system forms a three dimensional article of manufacture through a layer-by-layer process. Layers are formed by the operation of a light engine selectively curing photocure resin onto a face of the three dimensional article of manufacture. The sensor includes a photodetector overlaid by an optical element. The optical element simulates a "dense portion" of an optical path between the light engine and the face of the three dimensional article of manufacture being formed. The "dense portion" of the optical path includes a layer of photocure resin that is disposed between the light engine and the face of the three dimensional article of manufacture.

11 Claims, 8 Drawing Sheets

(51) Int. Cl.
*B29C 64/393* (2017.01)
*B29C 64/135* (2017.01)
*G01M 11/00* (2006.01)
*B29C 64/129* (2017.01)
*B29C 64/124* (2017.01)

(56) References Cited

U.S. PATENT DOCUMENTS

| | | |
|---|---|---|
| 6,646,728 B1 | 11/2003 | Tang et al. |
| 9,833,985 B2 | 12/2017 | Kobayashi |
| 2015/0123320 A1 | 5/2015 | Joyce |
| 2017/0100895 A1* | 4/2017 | Chou ................ B29C 64/393 |
| 2018/0003953 A1* | 1/2018 | Fujiwara ................ G02B 1/11 |
| 2018/0141278 A1* | 5/2018 | Adzima ................ B33Y 50/02 |
| 2018/0186082 A1* | 7/2018 | Randhawa ........... B23K 26/125 |
| 2018/0370148 A1* | 12/2018 | Sekine ................ B33Y 40/00 |

FOREIGN PATENT DOCUMENTS

| | | |
|---|---|---|
| JP | 2002-210835 A | 7/2003 |
| WO | 2017114845 | 7/2017 |

OTHER PUBLICATIONS

PCT International Written Opinion for International Application No. CT/US2017/066366, dated Apr. 5, 2018 (9 pages).
English Translation of Office Action for Japanese Application No. 2019-531334, dated Aug. 6, 2020 (3 pages).

* cited by examiner

SENSOR THAT SIMULATES RESIN OPTICAL PROPERTIES

CROSS REFERENCE TO RELATED APPLICATIONS

This non-provisional patent application claims priority to U.S. Provisional Application Ser. No. 62/440,168, Entitled "SENSOR THAT SIMULATES RESIN OPTICAL PROPERTIES" by Guthrie Cooper, filed on Dec. 29, 2016, incorporated herein by reference under the benefit of U.S.C. 119(e).

FIELD OF THE INVENTION

The present disclosure concerns an apparatus and method for the digital fabrication of three dimensional articles of manufacture through the solidification of liquid photoncurable (photocure) resins. More particularly, the present disclosure concerns an advantageous method of calibrating a projection based system used to cure photocure resins.

BACKGROUND

Three dimensional printers are in widespread use. Examples of three dimensional printer technologies includes stereolithography, selective laser sintering, and fused deposition modeling to name a few. Stereolithography-based printers utilize a controllable light engine to selectively harden or solidify a liquid photocure resin. In some embodiments the light engine is a projector that projects a pixelated image map up to a build plane. When a pixel is "on", the liquid at that location hardens during the build process.

One challenge with such projection systems is calibration. Variations in optics and the light engine need to be characterized so that a control of the light engine can provide a desired energy level for each pixel. For example if one pixel is "weak" then the light source can be controlled to increase a duration of the on time for the pixel so as to provide a desired energy. One challenge with such as a system is the attenuation of the light through the resin. The energy density distribution reaching the build plane in resin is different than that received directly from the light source with no resin even with the same distances involved. There is a need to provide an accurate way to calibrate such a system.

SUMMARY

Figure 1:
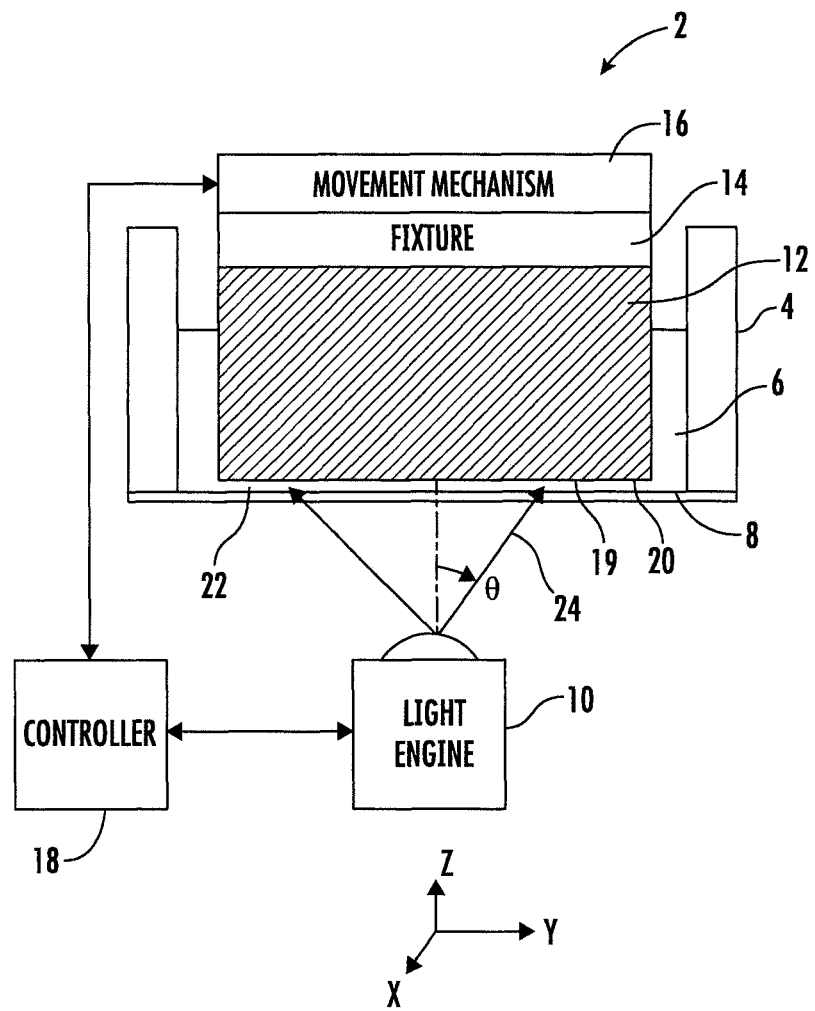
FIG. 1 is a schematic block diagram of a three dimensional printing system for the digital fabrication of three dimensional articles of manufacture through the solidification of liquid photocure resins.

In a first aspect of the invention, a calibration system for a three dimensional printing system includes at least one sensor, a positioning apparatus, and a controller. The three dimensional printing system forms a three dimensional article of manufacture through a layer-by-layer process. Layers are formed by the operation of a light engine selectively curing photocure resin onto a face of the three dimensional article of manufacture. The at least one sensor includes a photodetector overlaid by an optical element. The optical element simulates a "dense portion" of an optical path between the light engine and the face of the three dimensional article of manufacture being formed. The "dense portion" of the optical path refers to a liquid and/or solid (not gaseous) portion of the optical path which includes a layer of photocure resin that is disposed between the light engine and the face of the three dimensional article of manufacture. The positioning apparatus is configured to position the at least one sensor to provide coverage of a lateral build plane (defining the lateral extent) of the light engine. The controller is configured to: (a) activate the light engine to illuminate the build plane at a lateral position; (b) receive a signal from the at least one sensor in response to received light from the light engine; (c) repeat (a)-(b) until a set of calibration values mapping the light engine build plane is defined; and (d) store the set of calibration values for the light engine, the calibration values compensating for a variation in the optical path as a function of the lateral position in the build plane.

In one implementation the light received by the at least one sensor from the light engine defines a trajectory angle relative to a central axis. The trajectory angle varies according to the lateral position within the lateral build plane of the light engine. The path length of the dense portion of the optical path increases as the trajectory angle increases. In one embodiment the lateral build plane of the light engine is substantially rectangular and defines a center coincident with the central axis and peripheral edges. The trajectory angle increases with a lateral distance from the center of the build plane. In a more particular embodiment the length of the dense portion of the optical path is proportional to a reciprocal of a cosine of the trajectory angle within the dense portion of the optical path.

In another implementation the light engine includes an ultraviolet (UV) light source. In one embodiment the UV light source is a light emitting diode. In another embodiment the UV light source is a UV laser.

In yet another implementation the optical element includes one or more of an attenuator and a diffuser. In one embodiment the optical element includes a glass attenuator or a transparent sheet that simulates a specular surface of resin. In another embodiment the optical element includes a plastic diffuser that simulates turbidity of a resin. The turbidity can be simulated by a controlled surface roughness. In a particular embodiment the optical element includes a plastic diffuser that is about one millimeter thick and an overlying glass attenuator that is about one millimeter thick. In yet another embodiment the diffuser can be formed from a semi translucent glass such as an opal glass. In another particular embodiment the attenuator can have a optical density in a range of 1 to 4 to protect the photodetector from intense radiation. In a yet more particular embodiment the attenuator can have a optical density of 2 whereby it blocks 99% of the light to protect the photodetector.

In a further implementation the light engine includes a light source that provides light to a spatial light modulator that generates an array of pixel elements over the lateral build plane of the light engine. The array of pixel elements defines a center coincident with a central axis and peripheral edges. Light received by the sensor defines a trajectory angle relative to the central axis which increases in any direction away from the center and toward the peripheral edges. The path length of the dense portion of the optical path is proportional to a reciprocal of a cosine of the trajectory angle. In some embodiments, the dense portion of the optical path can include more than one index of refraction whereby the trajectory angle varies within position within the dense portion. Then the path length of the dense portion includes a sum of path length segments, with each segment having a path length that varies as a reciprocal of the trajectory angle within that segment.

In another implementation the light engine includes a light source that provides light to a spatial light modulator that generates an array of pixel elements over the lateral build plane of the light engine. In a first embodiment a plurality of the pixel elements are activated according to step (a) in order to provide light to the sensor. In a second embodiment at least 10 pixel elements are activated according to step (a) in order to provide light to the sensor. In a third embodiment at least 100 pixel elements are activated according to step (a) in order to provide light to the sensor. In a fourth embodiment at least 1000 pixel elements are activated according to step (a) in order to provide light to the sensor. In a fifth embodiment at least 4000 pixel elements are activated according to step (a) in order to provide light to the sensor. In other embodiments, between 1 and 100 pixel elements are activated according to step (a). In yet other embodiments between 10 and 100 pixel elements are activated according to step (a).

In yet another implementation the positioning apparatus is a movement mechanism for translating the at least one sensor across the lateral build plane. In one embodiment the movement mechanism is configured to translate the at least one sensor in two lateral dimensions.

In a further embodiment the at least one sensor is a linear array of sensors spans a first lateral axis of the build plane. The positioning apparatus is a movement mechanism configured to translate the linear array of sensors along a second lateral axis that is orthogonal to the first lateral axis to allow the linear array of sensors to provide the coverage of the build plane.

In another embodiment the at least one sensor is a two dimensional array of sensors. The positioning apparatus is a fixture for supporting the two dimensional array of sensors to span the lateral build plane.

In a second aspect of the invention, a three dimensional printing system includes a vessel containing resin, a light engine, and a controller. The three dimensional printing system forms a three dimensional article of manufacture through a layer-by-layer process. Layers are formed by the operation of a light engine selectively curing photocure resin onto a face of the three dimensional article of manufacture. The light engine is configured to selectively apply radiation along a varying optical path whereby resin is cured proximate to a laterally extending build plane. The optical path defines a trajectory angle relative to a central axis that varies as a function of a lateral position in the build plane. A path length of a dense portion of the optical path from the light engine to the lateral position varies according to the trajectory angle. The controller is configured to store a map of calibration values that correspond to the lateral positions in the build plane, the calibration values defining a compensation for the variation in the path length of the dense portion of the optical path and to operate the light engine using the calibration values to selectively cure layers of the resin onto the face of the three dimensional object of manufacture whereby the energy applied to lateral positions is adjusted to compensate for the varying path length of the dense portion of the optical path in the build plane.

In one implementation the path length of the dense portion of the optical path increases as the trajectory angle increases. In one embodiment the path length of the dense portion of the optical path is substantially proportional to a reciprocal of the cosine of the trajectory angle within the dense portion. In some embodiments an index of refraction of the design portion of the optical path may vary. Then the path length of the dense portion is a sum of individual path lengths.

In another implementation the light engine is configured to generate a pixelated image over the build plane. The central axis passes through a center point of the build plane.

In a further implementation the build plane is defined by an array of pixel elements at a constant vertical position. The build plane has a center coinciding with the central axis and peripheral edges. The trajectory angle increases with a lateral distance along the build plane from the center.

DETAILED DESCRIPTION OF THE PREFERRED EMBODIMENTS

FIG. 1 is a schematic block diagram representation of a three dimensional printing system 2 that has a novel calibration system and method for compensating for the optical properties of a photocurable resin. In describing this the following figures, mutually perpendicular axes X, Y and Z will be used. Axes X and Y are lateral axes. In some embodiments X and Y are also horizontal axes. Axis Z is a central axis. In some embodiments Z is a vertical axis. In some embodiments the direction +Z is generally upward and the direction −Z is generally downward.

Three dimensional printing system 2 includes a vessel 4 containing a photocurable resin 6. Vessel 4 includes a transparent sheet 8 that defines at least a portion of a lower surface of vessel 4. A light engine 10 is disposed to project light up through the transparent sheet 8 to solidify the photocure resin and to form a three dimensional article of manufacture 12. The three dimensional article of manufacture is attached to a fixture 14. A movement mechanism 16 is coupled to fixture 14 for translating the fixture 14 along vertical axis Z.

A controller 18 is electrically or wirelessly coupled to the light engine 10 and the movement mechanism 16. Controller 18 includes a processor coupled to an information storage device (not shown). The information storage device includes a non-transient or non-volatile storage device (not shown) that stores instructions that, when executed by the processor, control the light engine and the movement mechanism. These instructions may include instructions that define the processes and/or methods described in FIGS. 4, 6, and 8. Controller 18 can be contained in a single IC (integrated circuit) or multiple ICs. Controller 18 can be at one location or distributed among multiple locations in three dimensional printing system 2.

The three dimensional article of manufacture 12 has a lower face 19 that faces transparent sheet 8. Between the lower face 19 and the transparent sheet 8 is a thin layer 22 of the photocure resin 6. As the light engine 10 operates the lower face 19 selectively grows downwardly (−Z) in a layer-by-layer basis or a continuous basis. The Z-value for the lower face 19 is coincident with or proximate to a "build plane" 20.

Figure 2:
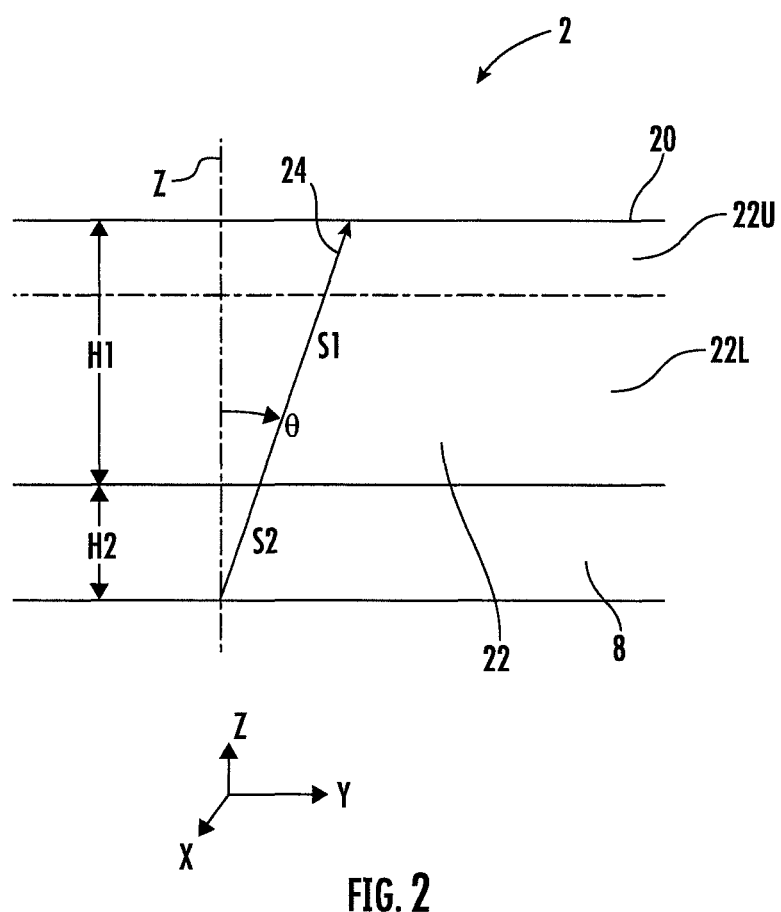
FIG. 2 is a magnified portion of a three dimensional printing system to illustrate a solid portion of an optical path from a light engine to a build plane.

Under control of the controller 18, the light engine 10 generates an image frame slice. An image frame slice is a pixelated and time-weighted image that is projected from light engine 10 to the lower face 19 to form a new layer onto lower face 19. The pixelated image expands laterally as it progresses upwardly from light engine 10 to the lower face 19. The photocure resin 6 has a degree of attenuation and reflectivity that reduces an intensity of light reaching lower face 19. The reduction is a function of lateral position. This is because the distance through the thin layer 22 of the photocure resin 6 increases by the reciprocal of the cosine of a trajectory angle theta (A) of impinging light within the photocure resin 6. The effect becomes more pronounced at the edge of an array. FIG. 2 helps to show this effect in more detail.

FIG. 2 is a magnified view of a portion of three dimensional printing system 2 to illustrate a dense (solid and/or liquid) portion of the optical path 24 of light from the light engine 10 to the lower face 19 of the three dimensional article of manufacture 12. Light engine 10 selectively projects or directs light over a lateral area of a build plane 20 that coincides in Z with the lower face 19 of the three dimensional article of manufacture. The build plane 20 laterally extends to the lateral limits of an ability for the light engine to process the thin layer of resin 22. In this figure some dimensions are defined. H1 is a vertical thickness along Z of the thin layer of resin 22. H2 is a vertical thickness of the transparent sheet 8.

In the illustrative embodiment, light beams or rays 24 forming part of the optical path from light engine 10 pass through a transparent sheet 8 before passing through the thin layer of resin 22. In some embodiments a source of an inhibitor is passed from a lower side of the transparent sheet 8 to the thin layer of resin in order to maintain a zone of resin 22L that does not cure in order to avoid solidification of resin onto the transparent sheet 8. During selective illumination of the layer of resin 22 only a thinner upper layer 22U of resin is actually cured. The effect of this is to increase a length of a dense portion S of the optical path that light must pass through between light engine 10 and the build plane 20.

The length of the dense portion of the optical path is equal to S=S1+S2. The contribution of S1 is that of the thin layer of resin 22 and is most significant because it includes light absorbing molecules that initiate the cure of resin layer 22. The length of S1 is greater than the vertical thickness H1 and is a function a lateral position on the build plane. The farther from the central axis Z it is, the greater the trajectory angle theta (θ) and hence the greater the path length S1. Generally the path length S1=H1/cosine(θ). Also S2=H2/cosine(θ). Therefore S=S1+S2. For some light engine geometries the difference in path length can be very substantial. Without compensation this will result in substantial errors in the light dosage for laterally peripheral portions of the three dimensional object of manufacture.

As a note, the illustrated dense part of the optical path 24 would exhibit some angular deflection due to Snell's law. This would affect the angle theta (θ) to some extent, bending the light toward the central axis to an extent based upon a change in index of refraction at the interfaces. Thus, the angle theta (θ) would be different for the air, the resin 22, and the transparent sheet 8 and this would affect the computations above. Other details of optical path 24 are omitted for illustrative simplicity.

Figure 3:
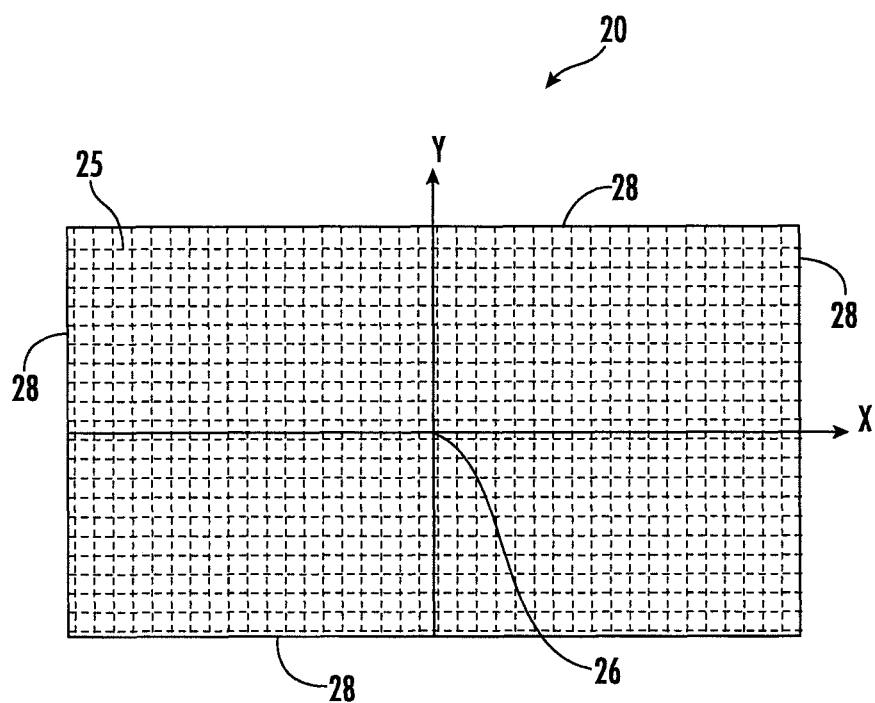
FIG. 3 depicts a pixelated lateral build plane in X and Y at a constant value of Z.

FIG. 3 depicts the lateral build plane 20 for a fixed value of Z. The lateral build plane 20 includes the lateral extent of the light engine in X and Y for the fixed value of Z. The light engine 10 generates a pixelated image with an array of individual pixel elements 25 across X and Y. Each individual pixel element 25 can be varied in energy dosage based on a gray level. On some embodiments there can be 8 levels of gray (8 bit grayscale). The build plane 20 defines the lateral build plane of the light engine 10. The build plane 20 has a center 26 and peripheral edges 28. The center 26 is defined at X=0 and Y=0 and coincides with the central axis Z. At the center 26 the trajectory angle theta (θ) equals zero. As the absolute value of X and Y increase from center 26, the trajectory angle theta (θ) increases. While the lateral build plane 20 is depicted as being rectangular in shape, it may be distorted due to image corrections that are applied to light engine 10. However, the center 26 is still defined by the trajectory angle theta (θ) being zero and a trend for an increasing trajectory angle theta (θ) away from the center 26 still holds true.

FIG. 3 depicts build plane 20 as having far fewer pixel elements 25 than a typical system for illustrative simplicity. In practice, build plane 20 can have one million or more individual pixel elements 25.

While illustrations have depicted a three dimensional printing system 2 with the dense portion of the optical path including transparent sheet 8, other three dimensional printing systems may be contemplated. Some of these systems direct laser light from above resin 6 and don't require the transparent sheet 8. Such systems can also be improved with the disclosed calibration method.

Figure 4:
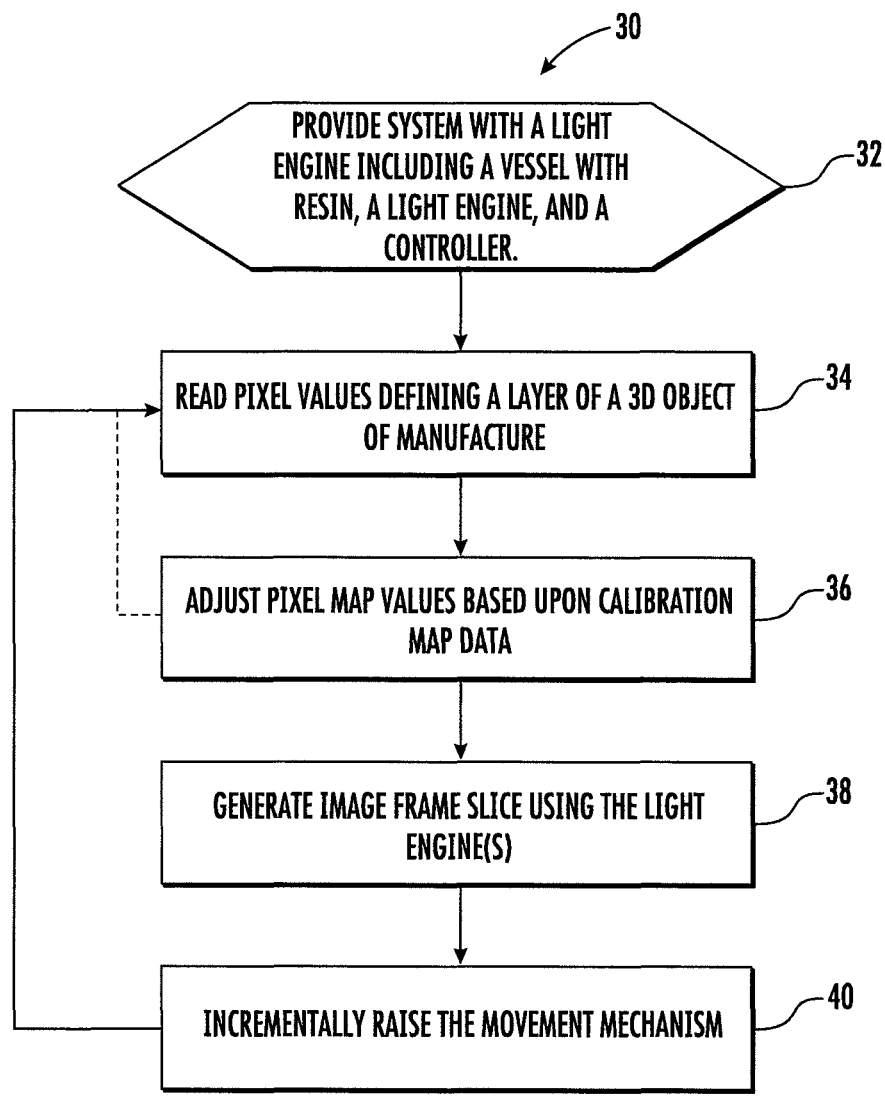
FIG. 4 is a flowchart depicting a method of operation of the three dimensional printing system of FIG. 1.

FIG. 4 is a flowchart depicting a method 30 for fabricating a three dimensional article of manufacture using a three dimensional printer similar to that depicted in FIGS. 1-3. According to step 32 a three dimensional printing system 2 is provided that includes a vessel 4 containing resin 6, a light engine 10, and a controller 18.

The light engine 10 is configured to apply radiation along an optical path 24 whereby resin is cured proximate to a laterally extending build plane 20. The optical path 24 defines a trajectory angle theta (θ) relative to central axis Z that varies as a function a lateral position (X, Y) in the build plane 20. A path length S of a dense portion of the optical path 24 varies according to the trajectory angle theta (θ).

The controller 18 is configured to store a map of calibration values that correspond to the lateral positions (X, Y) in the build plane 20. The calibration values define a compensation for the variation in path length S of the dense portion of the optical path 24.

According to step 34 pixel values are read defining a layer of the three dimensional object of manufacture at a build plane. These pixel values are each proportional to a degree of cure for each pixel element. According to step 36, the pixel values are corrected based upon the calibration values from step 32. According to step 38 an image slice frame is generated based upon the corrected pixel values which selectively cures a layer of the photocure resin proximate to the build plane 20. According to step 40, the movement mechanism incrementally moves the lower face 19 upward. Steps 34-40 are then repeated until the three dimensional article of manufacture 12 is fully fabricated.

In an alternative embodiment, steps 34 and 36 are performed for all layers before step 38. In this alternative embodiment steps 38 and 40 are repeated to fabricate the three dimensional object of manufacture 12.

In various embodiments the calibration values define multipliers for increasing or decreasing pixel values as a function of a lateral position (X, Y). In one embodiment the multiplier for the center of the build plane 20 would be less than 1 (decreased to compensate for a shorter path length of the dense part of the optical path). The multiplier for remaining locations would be greater based upon an increase in the path length versus position.

Figure 5:
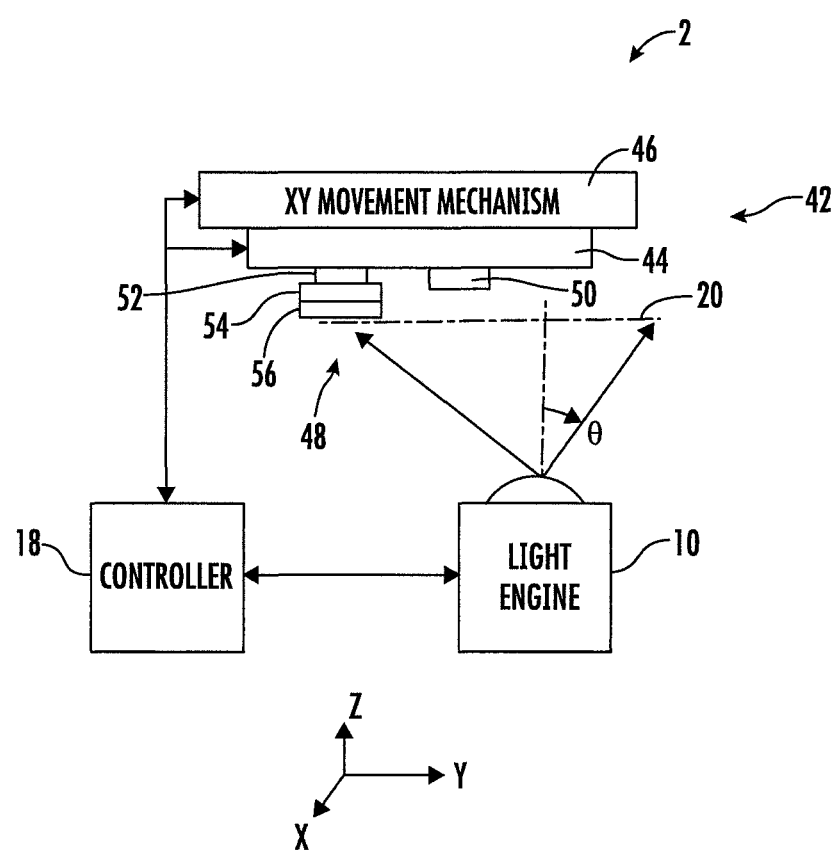
FIG. 5 is a schematic block diagram illustrating a portion of a three dimensional printing system with a calibration apparatus.

FIG. 5 is a schematic block diagram illustrating a portion of a three dimensional printing system 2 with a calibration apparatus 42 coupled to a controller 18 for calibrating light engine 10 in a way that takes the resin 6 into account. Apparatus 42 includes a sensor board 44 coupled to an XY movement mechanism 46. Mounted on sensor board 44 is an optical sensor 48 and a thermal sensor 50. Data from the thermal sensor 50 is utilized by controller 18 to calibrate the sensor 48 since the output of sensor 50 may be a function of temperature.

Optical sensor 48 includes a photodiode 52 that is covered by one or more optical elements 54 and 56. In the illustrated embodiment optical element 54 is a 1 millimeter thick plastic diffuser and optical element 56 is a 1 millimeter thick glass attenuator. Together these optical elements 54 and 56 have been found experimentally to simulate a range of different resins. In alternative systems other optical elements might be used that have different materials and/or different thicknesses.

The optical elements 54 and 56 can simulate the turbidity, attenuation, and/or specular characteristics of the thin layer 22 of resin 6. The optical elements 54 and 56 introduce an optical path length that varies with trajectory angle theta (θ) to a degree that is similar to that of the thin layer 22 of the resin.

Light engine 10 is configured to project a pixelated image over build plane 20. The movement mechanism 46 positions the sensor 48 on or proximate to the build plane 20 and allows for movement in X and Y to traverse the build plane 20.

In another embodiment sensor 48 is a linear array of sensors 48 that extends along the X axis. Movement mechanism 46 is configured to scan along the Y axis. In yet another embodiment a two dimensional grid pattern of sensors 48 are provided that span the build plane 20. Then a positioning apparatus 46 can be used to position the entire array of sensors 48 relative to the build plane.

Figure 6:
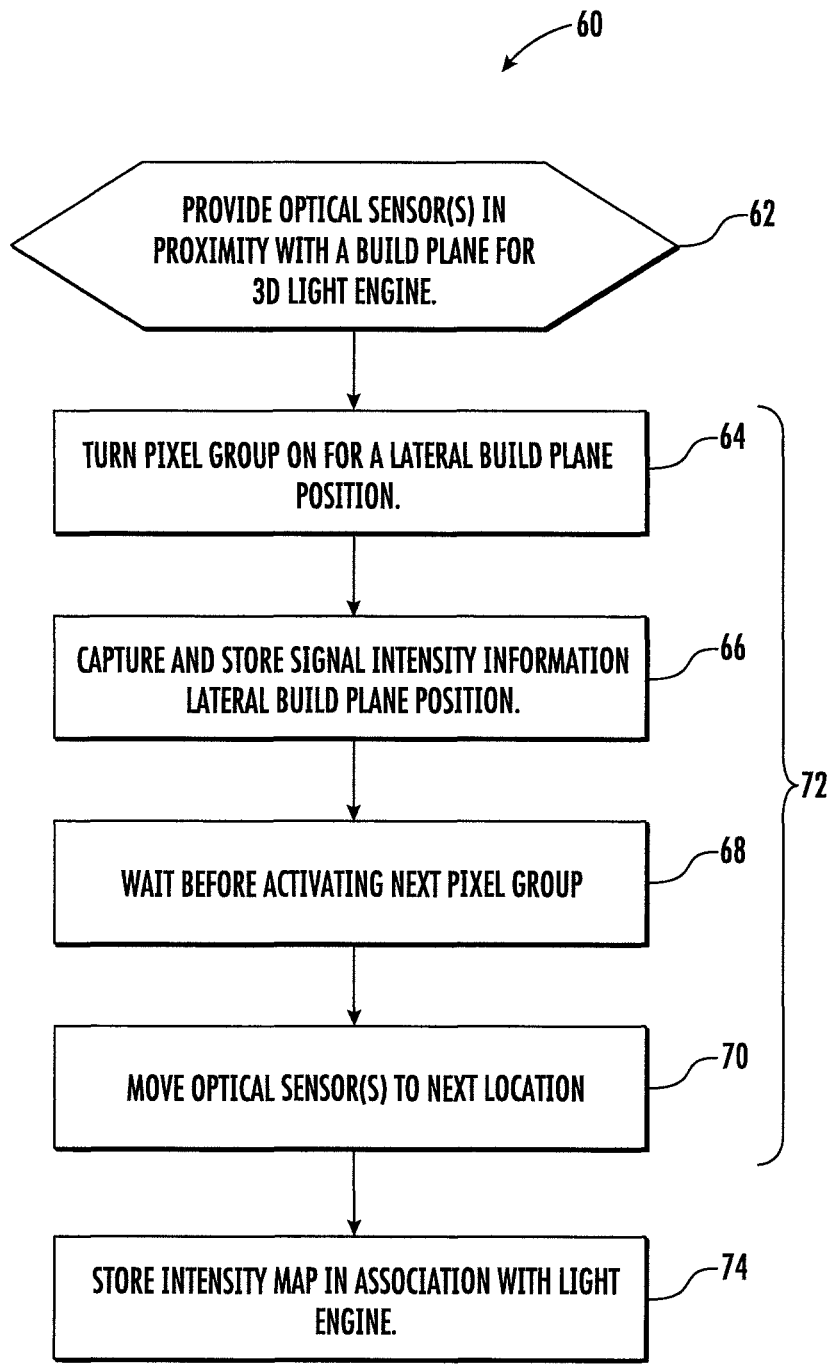
FIG. 6 is a flowchart representing a calibration process utilizing the a calibration apparatus similar to that depicted in FIG. 5 or FIG. 7.
Figure 7:
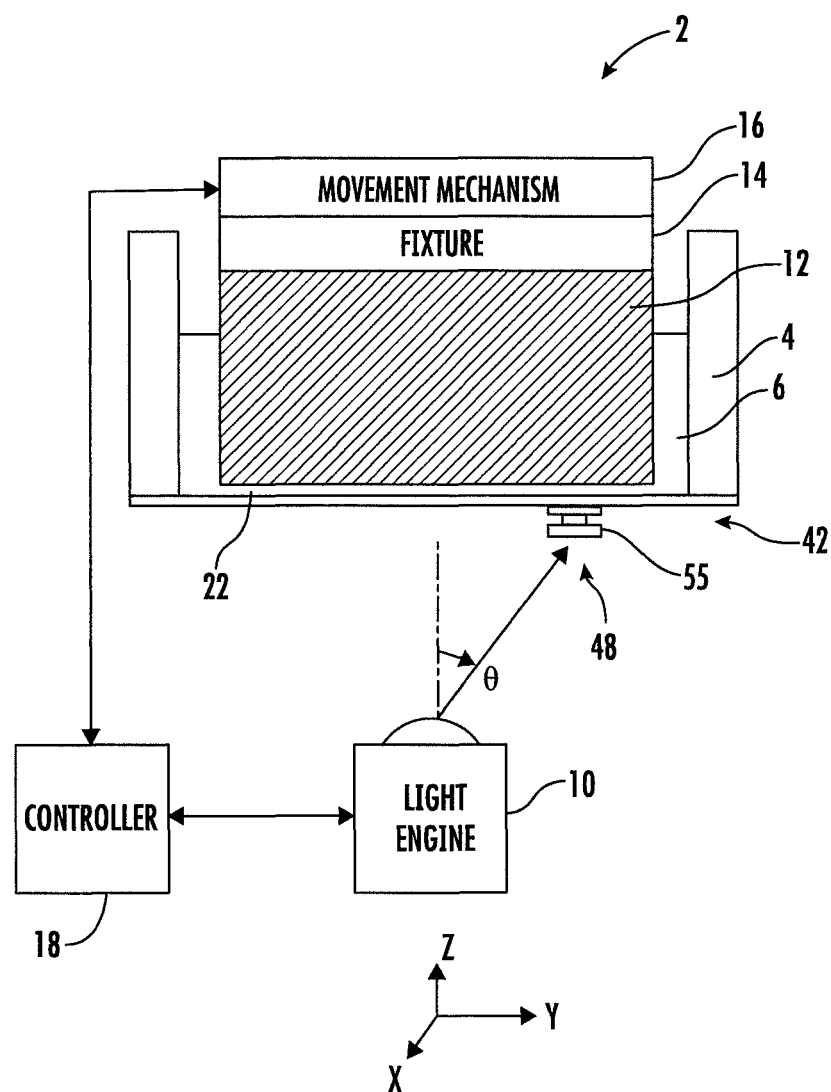
FIG. 7 is a schematic block diagram of a three dimensional printing system incorporating a calibration apparatus.

FIG. 6 is a flowchart representing an embodiment of a calibration method 60 for the system of FIG. 5 or FIG. 7. According to step 62 the at least one optical sensor 48 is positioned proximate to the build plane 20.

According to step 64, one or more pixel elements are turned on to illuminate one or more contiguous (X, Y) locations on the build plane 20. A plurality of activated contiguous pixel elements can be referred to as an activated "pixel group."

According to step 66, the optical sensor 48 receives light from the activated one or more pixel elements or from the activated pixel group. In response, the optical sensor 48 generates a signal that is received by controller 18. The signal is indicative of an intensity received by the photodiode 52 and information from the thermal sensor 50. Controller 18 stores information indicative of the signal for the pixel location. According to optional step 68, system waits to mechanically or thermally stabilize before the next pixel group activation. In one embodiment the system waits 5 seconds. According to step 70 the movement mechanism 46 moves the optical sensor 48 to another location.

According to bracket 72, the process of steps 64-70 is repeated until intensity information is collected for the entire build plane 20. According to step 74, the results are stored as a set of calibration values for different (X, Y) locations for the build plane 20.

In a first alternative embodiment of method 60, the optical sensor 48 is a linear array of optical sensors 48. Steps 64-68 are cycled through for the optical sensors individual optical sensors in each row before the row is moved according to step 68.

In a second alternative embodiment of method 60 the optical sensor is a two dimensional array of sensors that spans the build plane 20. Then step 70 is not necessary.

FIG. 7 is a block diagram representation of a three dimensional printing system 2 that incorporates the calibration described with respect to FIGS. 5 and 6. Printing system 2 of FIG. 7 is similar to that of FIG. 1 but also includes calibration system 42. Otherwise like element numbers depict like elements.

The power output of a light engine 10 can be a variable function of factors such as temperature, power input parameters, and aging of the components. Calibration system 42 allows for periodic calibration of printing system 2 to improve accuracy as these factors vary over time. Sensor 48 has an optical element 55 that can be a single layer or multiple layers of translucent and/or transparent material that simulate the transparent sheet 8 and the thin layer of resin 22 that light from the light engine must pass through at varying angles.

Figure 8:
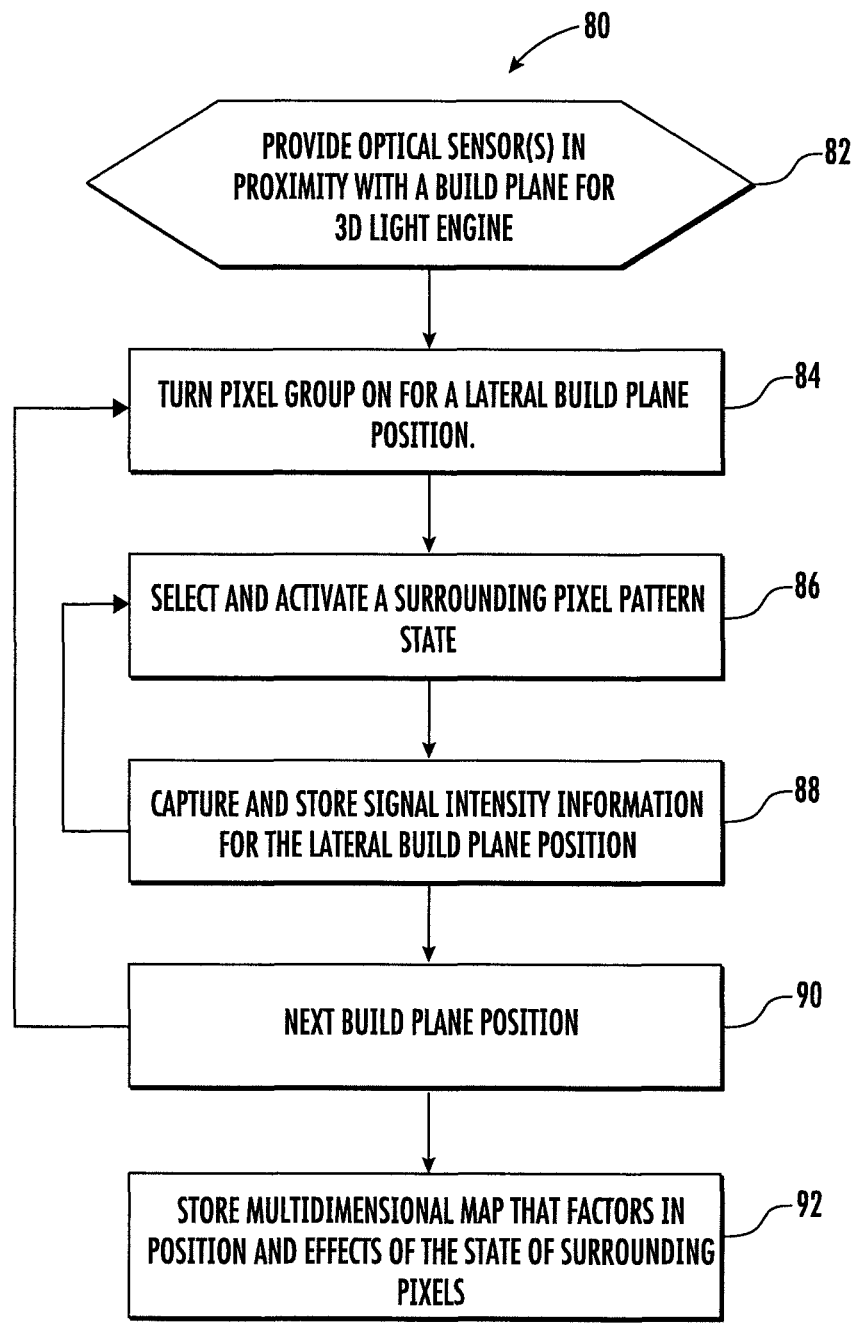
FIG. 8 is a flowchart depicting an alternative calibration process utilizing a calibration apparatus such as one depicted in FIG. 5, FIG. 7, or for a system with top illumination (e.g., a laser for curing resin).

FIG. 8 is a flowchart depicting an alternative method 80 for calibrating a system of FIG. 5, FIG. 7, or a system with top illumination (not shown). According to step 82, one or more optical sensors 48 are provided in proximity with a build plane 20. The one or more optical sensors 48 can be a single optical sensor 48, a columnar array of optical sensors 48 that are linearly scanned across the build plane 20, or a two dimensional array of optical sensors 48.

According to step 84, a pixel group to be measured is activated. The pixel group can include one or more pixels. When the pixel group includes a plurality of pixels, they typically form a contiguous group that is simply connected. The pixel group can include 1-10, 10-100, 100-1000, or more than 1000 pixels.

According to step 86, a surrounding pixel pattern state is activated. According to step 88, intensity information is captured and stored for the lateral build plane position. Steps 86 and 88 are repeated for a set of surrounding pixel pattern states. Examples of these surrounding pixel pattern states are as follows: State a—all other pixels are off (black). State b—all other pixels are on (illuminated). State c—select surrounding pixels are on (illuminated) while others are off (black). State c can actually include a number of different states with varying patterns of on and off pixels. The purpose of cycling through these states is to quantify the effect of varying states of surrounding pixels on the pixel group corresponding to the build plane position.

According to step 90 the process of steps 84-88 (including the states for surrounding pixels) are repeated for the next build plane position. Steps 84-88 are repeated for all remaining build plane positions.

According to step 92, a calibration map is stored that takes into account which pixels are on for a given layer of material to be selectively cured. This map is then used in step 36 of FIG. 4.

While illustrations have depicted a three dimensional printing system 2 with the dense portion of the optical path including transparent sheet 8, other systems may be improved with this compensation. Some of these systems direct laser light from above resin 6 and don't require the transparent sheet 8. Such systems can be improved with the disclosed calibration apparatus and method.

The specific embodiments and applications thereof described above are for illustrative purposes only and do not preclude modifications and variations encompassed by the scope of the following claims.

I claim:

1. A calibration system for a three dimensional printing system which forms a three dimensional article of manufacture through a layer-by-layer process with layers being formed by the operation of a light engine selectively curing photocure resin onto a face of the three dimensional article of manufacture comprising:
   at least one sensor including a photodetector overlaid by an optical element, the optical element simulating a dense portion of an optical path between the light engine and the face of the three dimensional article of manufacture, the dense portion of the optical path including a layer of the photocure resin, the optical element separated from the photocure resin and having optical path properties that physically simulate optical properties of the dense portion of the optical path, the optical path properties including one or more of attenuation, turbidity, and specular characteristics;
   an apparatus for positioning the at least one sensor to provide coverage of a lateral build plane of the light engine; and
   a controller configured to:
   (a) activate the light engine to illuminate the build plane at a lateral position;
   (b) receive a signal from the at least one sensor in response to received light from the light engine;
   (c) repeat (a)-(b) until a set of calibration values mapping the light engine build plane is defined; and
   (d) store the set of calibration values for the light engine, the calibration values compensating for a variation in the optical path as a function of the lateral position in the build plane.

2. The calibration system of claim 1 wherein light received by the at least one sensor defines a trajectory angle relative to a central axis which varies according to the lateral position, a path length of the dense portion of the optical path increases as the trajectory angle increases.

3. The calibration system of claim 2 wherein the length of the dense portion of the optical path is substantially proportional to a reciprocal of a cosine of the trajectory angle within the dense portion of the optical path.

4. The calibration system of claim 1 wherein the light engine includes an ultraviolet light source.

5. The calibration system of claim 1 wherein the portion of the optical path further includes a transparent sheet to be disposed between the light engine and the layer of photocure resin.

6. The calibration system of claim 1 wherein the optical element includes an attenuator that simulates specular characteristics of the portion of the optical path.

7. The calibration system of claim 1 wherein the optical element includes a diffuser that simulates a turbidity of the portion of the optical path.

8. The calibration system of claim 1 wherein the light engine generates an array of pixel elements.

9. The calibration system of claim 8 wherein, according to step (a), a plurality of the pixel elements are activated to provide light to the sensor.

10. The calibration system of claim 8 wherein, according to step (a), at least 100 of the pixel elements are activated to provide light to the sensor.

11. The calibration system of claim 8 wherein, according to step (a), at least 1000 of the pixel elements are activated to provide light to the sensor.

* * * * *